United States Patent
Fujishiro

(12) 
(10) Patent No.: US 6,914,651 B1
(45) Date of Patent: Jul. 5, 2005

(54) LIQUID-CRYSTAL DISPLAY DEVICE INCLUDING A REFLECTOR WITH IRREGULARITY PATTERN AND METHOD OF FABRICATING SAME

(75) Inventor: Fumihiko Fujishiro, Kanagawa (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 67 days.

(21) Appl. No.: 10/630,682

(22) Filed: Jul. 31, 2003

(30) Foreign Application Priority Data

Aug. 1, 2002 (JP) ..................................... 2002/224639

(51) Int. Cl.[7] ........................................... G02F 1/1335
(52) U.S. Cl. ...................................... 349/113; 349/63
(58) Field of Search ........................... 349/61, 63, 113; 362/26, 31

(56) References Cited

U.S. PATENT DOCUMENTS

| | | | |
|---|---|---|---|
| 6,606,139 B2 * | 8/2003 | Yoshii et al. ............... | 349/114 |
| 6,734,934 B2 * | 5/2004 | Yoshii et al. ............... | 349/113 |
| 2002/0135718 A1 * | 9/2002 | Jang ........................... | 349/113 |
| 2003/0164912 A1 * | 9/2003 | Eguchi et al. ............... | 349/113 |
| 2004/0223097 A1 * | 11/2004 | Kamijo ........................ | 349/113 |

FOREIGN PATENT DOCUMENTS

| | | |
|---|---|---|
| JP | 8-101384 | 4/1996 |
| JP | 2000-298274 | * 10/2000 |
| JP | 2000-330104 | 11/2000 |

* cited by examiner

*Primary Examiner*—Tarifur R. Chowdhury
(74) *Attorney, Agent, or Firm*—McGinn & Gibb, PLLC

(57) ABSTRACT

A reflective or semi-transmissive type LCD device reduces a moire generated by the irregularity pattern of the reflector plate of the LCD panel. A front light has an optical guide plate in which prism grooves are arranged in an arrangement direction. The pattern of the reflector plate is formed by blocks, each of which includes a basic irregularity pattern for one pixel or its element, and (N−1) modified basic irregularity pattern or patterns each formed by modifying the basic irregularity pattern. All the basic irregularity patterns in each block are arranged in a direction perpendicular to the arrangement direction. The basic irregularity pattern is continuous at either end thereof in the arrangement direction. The basic irregularity pattern is divided in the arrangement direction into N sub-patterns. Each of the (N−1) modified basic irregularity patterns is formed by the N sub-patterns circularly shifted one by one.

4 Claims, 10 Drawing Sheets

(VIEWER'S SIDE)

(a)

(b)

LIQUID-CRYSTAL DISPLAY DEVICE INCLUDING A REFLECTOR WITH IRREGULARITY PATTERN AND METHOD OF FABRICATING SAME

BACKGROUND OF THE INVENTION

1. Field of the Invention

The present invention relates to liquid-crystal display (LCD) devices. More particularly, the invention relates to a reflective type LCD device using a front light and a semi-transmissive type LCD device using a back light, and a method of fabricating the devices, which reduces moire (interference) to improve the display quality.

2. Description of the Related Art

As known well, LCD devices are classified into the "transmissive type" and the "reflective type". With the transmissive type LCD device, "an illumination source (a back light)" is required. Planar light is illuminated to the LCD panel from its backside with the back light and is temporally and spatially modulated by the LCD panel, thereby displaying information on its screen. On the other hand, with the reflective type LCD device, any dedicated back light is not incorporated, where ambient light is utilized to display information on its screen. Thus, the reflective type LCD device is unable to be used in the dusk or ill-lighted places. Generally, ill-lighted places are more popular than well-lighted ones and therefore, it is said that the display performance of the reflective type LCD device is less than the transmissive type LCD device.

The feature or advantage of the reflective type LCD device is that the back light which generates the majority part of electric power dissipation of the LCD module is unnecessary, or continuous illumination is unnecessary. Taking the advantage of low power dissipation into consideration, the device of this type is suitable for battery-driven portable electronic apparatuses, such as portable telephones and Personal Digital Assistants (PDAs). In addition, the device of this type has an advantage that the body is compact because the LCD module is thin.

Although the reflective type LCD device displays information on its screen using ambient light, it is popular that a light source called the "front light" is incorporated into the said device. This is because this device may be used in places where no external light is expected. The "front light" has a structure having a front optical guide plate and a small auxiliary light source mounted on the side of the plate.

Another type of the reflective type LCD device is the semi-transmissive (i.e., transmissive and reflective) type. With the semi-transmissive type LCD device, minute openings are formed to penetrate the reflector plate in such a way as to form a grid of dots, thereby making the said plate semi-transmissive. Therefore, the reflector plate serves as an optical diffuser plate for diffusing the light from the back light in ill-illuminated places or as an optical diffuser and reflector plate in well-illuminated places.

The reflective type LCD device comprises a reflector plate having diffusiveness, which is located behind the liquid crystal layer. The reflector plate may be placed inside or outside the liquid crystal cell. With the reflective type "color" LCD device, the reflector plate is placed outside the liquid crystal cell, where the microscopic shape and/or distribution of the bumps and holes in the surface of the reflector plate is/are controlled to optimize the distribution of reflected light. Thus, the degree of brightness is increased in a particular direction.

A metal electrode formed on the rear-side glass plate may be used as the reflector plate. This is to raise the reflectivity of the reflector plate in the reflective type LCD device by reflecting the light incident on the reflector plate as efficiently as possible. For example, the Japanese Non-Examined Patent Publication No. 8-101384 published on Apr. 16, 1996 discloses a method of forming a reflector electrode having the function of a reflector plate and the function of an electrode with aluminum (Al) having a high reflectivity and a low resistivity. Moreover, a method of displaying information by using the liquid crystal cell (in which bumps and holes are formed in the surface of the reflector electrode to generate a light scattering function), the phase plate, and the polarizer plate has been known. A method of forming the bumps and holes in the surface of the reflector electrode by a melt process has been known as well (Refer to the Japanese Non-Examined Patent Publication No. 2000-330104 published on Nov. 30, 2000).

FIGS. 1 and 2 schematically show the structure of a prior-art reflective type LCD device. FIG. 1 is a conceptual cross-sectional view showing the whole structure of the device and FIG. 2 is a conceptual plan view of the device seen from the viewer's side.

As shown in FIG. 1, the prior-art device comprises a reflective type LCD panel 11, a polarizer section 12, a light source 21 for the front light, and an optical guide plate 22 for the front light. Here, the panel 11 has a reflector plate with a surface irregularity (not shown) incorporated therein. The polarizer section 12 has a structure that a half-wave ($\lambda/2$) plate and a quarter-waver ($\lambda/4$) plate are stacked on a polarizer film.

The front light, which includes the light source 21 and the optical guide plate 22, is located in the front side (i.e., the viewer's side) with respect to the panel 11. While the front light is turned on, the guide plate 22 receives the light emitted from the source 21 such as a Light-Emitting Diode (LED), a Cold Cathode Fluorescent Lamp (CCFL), or the like. The plate 22 uniformizes the light in its inside to generate planar light and then, irradiates the light thus generated to the panel 11. Moreover, the panel 22 transmits the light reflected in the plate 22 to the viewer's side. If the LCD device is designed for PDAs, it is popular that a touch panel (not shown) is additionally mounted over the front light on the viewer's side.

Next, the propagation status of light in the guide plate 22 of the front light is explained with reference to FIG. 3.

As seen from FIG. 3, on the viewer's-side surface (i.e., the emission surface) of the guide plate 22, propagation parts 22a for allowing the light from the source 21 to propagate toward the viewer's side and reflection parts 22b for reflecting the light from the source 21 toward the panel 11 are formed. The combination of one of the propagation parts 22a and an adjoining one of the reflection parts 22b thereto constitutes an element termed a "prism". Therefore, on the viewer's-side surface of the plate 22, a plurality of prisms is periodically arranged to form a "prism array". Moreover, the groove formed in each of the prisms is termed a "prism groove". The period of the prism array is equal to the pitch P of the prism grooves.

When the guide plate 22 receives the light emitted from the source 21 by way of its incidence surface 22c, the plate 22 uniformizes the light thus received in its inside with the reflection parts 22b, generating planar light. Then, the plate 22 emits the planar light to the panel 11 located to the opposite side of the viewer's side. On the other hand, the plate 22 transmits the light reflected by the reflector plate 113 located in the LCD panel 11 toward the viewer's side by way of the propagation parts 22a.

Usually, the emission surface 22d of the guide plate 22, which is formed on the side of the panel 11, is covered with an anti-reflection (AR) layer (not shown). This is to reduce the so-called Fresnel reflection of light.

FIG. 2 is a schematic plan view of the above-described prior-art LCD device seen from the viewer's side. In FIG. 2(a), the light source 21 and the guide plate 22 for the front light are located on this side, and the reflector plate 113 is located behind them. Here, the angle of the prism array (i.e., the prism grooves) of the plate 22 with respect to the horizontal wiring lines of the panel 11 is defined as θ (θ≠0). In addition, FIG. 1 is a cross-sectional view along the line I—I in FIG. 2.

The reflector plate 113 has on its surface a specific surface irregularity, i.e., a specific reflection pattern formed by bumps and holes on the surface. The reflection pattern of the pixel PX 11 is schematically shown in FIG. 2(b). With the color LCD panel for displaying images in color, the pixel PX11 consists of three rectangular elements EL 11, EL 12, and EL 13 for Red (R), Green (G), and blue (B) colors. All the elements EL 11, EL 12, and EL 13 have the same reflection patterns.

FIG. 2(c) shows a conceptual model of reflection pattern of the pixel PX11 formed by the elements EL 11, EL 12, and EL 13. Since these elements EL 11, EL 12, and EL 13 have the same reflection patterns, the elements EL 11, EL 12, and EL 13 are painted out with the same color. The character "L" denotes the arrangement pitch of the pixels PX11.

As explained above, with the reflective type LCD device, information or image is usually displayed on the screen using ambient light, and the front light is required only in situations where no ambient light is expected. Therefore, it is important for the front light to be designed in such a way as not to degrade the characteristics and display quality of the panel 11.

First, a phenomenon to which we pay attention in connection with the display quality of the reflective type LCD device is "moiré (interference)" generated by the pitch P of the prism grooves of the guide plate 22 and the wiring lines of the panel 11. This phenomenon is referred to as the "first moiré" hereinafter.

The "first moiré" is recognizable regardless of whether the front light is turned on or not. To prevent the "first moiré" from occurring, generally, the following two design methods are adopted.

The first design method is a method that the prism groove pitch P of the guide plate 22 is equalized to the pixel pitch L of the panel 11 (i.e., P=L) and at the same time, the angle θ of the prism array (i.e., the prism grooves) of the plate 22 is set at zero (i.e., θ=0). The second design method is a method that the pitch P of the plate 22 and the angle θ of the prism array (i.e., the prism grooves) thereof are set in such a way as to satisfy the condition that the first moiré is not recognizable. In the second design method, there is an anxiety that bright lines and dark lines are observed and at the same time, the optical utilization efficiency is less than the first design method. Therefore, the first design method is usually adopted. Additionally, in the first design method, the stripe-shaped elements EL1, EL12, and EL13 of the pixel PX11 need to be located perpendicular to the prism array of the plate 22.

Second, there is a moiré generated in the state where the front light is being turned on, which is caused by the mirror reflection occurring directly below the guide plate 22. This moiré is referred to as the "second moiré" hereinafter.

As seen from FIG. 1, the front light forms a kind of diffraction grating. The light reflected by the reflection parts 22b of the plate 22 enters the LCD panel 11. In addition, for example, the light reflected by the surface of the polarizer section 12 enters the plate 22 again and thereafter, it propagates to the viewer's side by way of its propagation parts 22a. This means that this light passes through the said grating twice. Thus, the light having the zero-order and that having the first order induce optical interference, generating the "second moiré".

A measure against the "second moiré", i.e., the third design method, is to suppress the mirror reflection on the surface of the polarizer section 12 as much as possible. For example, the use of a polarizer plate having diffusibility on its surface will reduce the said mirror reflection. In addition, diffusion beads may be formed on the surface of the section 12 by the so-called "anti-glare process", in which the light is scattered at the boundary between the surface of the section 12 and the atmospheric air to give the diffusibility.

By the way, with the above-described prior-art LCD device, as shown in FIG. 2, the irregularity pattern (i.e., reflection pattern) of the reflector plate 113 of the LCD panel 11 is formed at random in each of the elements EL11, EL12, and EL13, or in the pixel PX11. However, the patterns of the adjoining elements EL11 and EL12, or EL12 and EL13 are the same. This is because, for example, when an irregularity pattern is randomly formed in the whole panel 11, there is a possibility that the obtainable reflection characteristics are not uniform in the entire surface of the plate 113, even if random numbers are used.

Moreover, when different surface irregularity patterns are formed in the respective pixels, there is a possibility that the obtainable reflection characteristics are different between the adjoining R, G, and B elements in the adjoining pixels, which makes it difficult to control the reflection characteristics. Since irregularity patterns are minute, the basic pattern is preferably limited in a narrow area to a certain extent taking the efficiency of mask design for the patterns into consideration.

Furthermore, there is a "third moiré" observed when the front light is being turned on, which is generated by the irregularity pattern of the reflector plate 113 of the panel 11. Specifically, as seen from the schematic plan view of the plate 113 in FIG. 4, the surface irregularity pattern of the plate 113 is randomly formed in each element (or each pixel). Therefore, there is a possibility that the beams of light reflected by the adjoining bump and hole, the adjoining bumps, or the adjoining holes of the pattern cause optical interference.

If the above-described first design method (P=L, θ=0°) is adopted, as shown in FIG. 2, the elements (or the pixels) are repeatedly arranged in the same direction as the arrangement direction of the prism grooves of the guide plate 22 at the same period as the grooves, thereby promoting the "third moiré". As a result, a moiré parallel to the prism grooves is formed. Actually, in the test conducted by the inventor, he prepared a TFT substrate where the reflector plate 113 was formed and then, he placed a front light fabricated by the first design method on the substrate. In this case, after turning the front light on, he observed colored interference light in the same direction as the prism array.

Similar to the measure against the second moiré, the third moiré can be reduced by giving diffusibility by way of surface treatment of the polarizer section 12. If so, however, there is a problem that contrast and recognizability degrade, when the pattern of the reflector plate 113 has less diffusibility (i.e., the pattern has many flat parts and high directivity). As a result, this measure is unable to suppress or eliminate the third moiré.

In addition to the said measure giving diffusibility by way of surface treatment of the polarizer section 12, there is a measure to improve the recognizability by way of filling the gap between the guide plate 22 and the section 12 with a resin. In this measure, however, the refractive index difference is decreased by the resin and thus, the light will be difficult to diffuse. As a result, the effect obtained by said measure giving diffusibility by way of surface treatment of the section 12 is not expected. This means that this measure is not applicable to suppress or eliminate the third moiré.

With the above-described first design method (P=L, θ=0°), the prism array of the guide plate 22 needs to be arranged in parallel to the horizontal wiring lines of the LCD panel 11. However, the condition of θ=0° is difficult to be realized due to the dispersion and clearance of the parts dimensions, or the assembly accuracy. If θ≠0°, the optical interference position deviates from its desired position and as a result, the third moiré will be recognized more easily.

The above-described explanation relates to the reflective type LCD device. However, there is a possibility that a similar moiré occurs in the "semi-transmissive type" LCD device, in which a back light is provided instead of the front light and information is displayed on the screen in ill-illuminated places by forming a penetration area in each element. When a back light is used, it is popular that a prism sheet and/or a prism guide plate is/are provided to raise the brightness. Therefore, due to the relationship between the periodicity of the prism grooves and the periodicity of the penetration areas, there is a possibility that optical interference (moiré) occurs.

SUMMARY OF THE INVENTION

The inventor created the present invention in consideration of the above-described situation.

Accordingly, an object of the present invention is to provide a reflective or semi-transmissive type LCD device that reduces effectively the "third moiré" generated by the irregularity pattern of the reflector plate of the LCD panel or its similar moiré, and a method of fabricating the device.

Another object of the present invention is to provide a reflective or semi-transmissive type LCD device that reduces the "third moiré" or its similar moiré without the efficiency degradation of mask design for display control and/or pattern formation, and a method of fabricating the device.

Still another object of the present invention is to provide a reflective or semi-transmissive type LCD device that improves the display quality, and a method of fabricating the device.

The above objects together with others not specifically mentioned will become clear to those skilled in the art from the following description.

According to a first aspect of the present invention, a reflective type LCD device is provided, which comprises:

a reflector plate with a irregularity pattern;

a front light having an optical guide plate in which prism grooves are arranged in parallel to each other in an arrangement direction;

the irregularity pattern being formed by a combination of blocks arranged in an array;

each of the blocks including a basic irregularity pattern for one pixel or one element thereof, and (N−1) modified basic irregularity pattern or patterns each formed by modifying the basic irregularity pattern, where N is a positive integer (N≧2);

the basic irregularity pattern and the (N−1) modified basic irregularity pattern or patterns in each of the blocks being arranged in a direction perpendicular to the arrangement direction;

the basic irregularity pattern being continuous at either end thereof in a same direction as the arrangement direction;

the basic irregularity pattern being divided in a same direction as the arrangement direction, thereby forming N sub-patterns; and each of the (N−1) modified basic irregularity pattern or patterns being formed by the N sub-patterns circularly shifted one by one.

With the reflective type LCD device according to the first aspect of the present invention, the irregularity pattern of the reflector plate is formed by a combination of blocks arranged in an array. Each of the blocks includes a basic irregularity pattern for one pixel or its element, and (N−1) modified basic irregularity pattern or patterns each formed by modifying the basic irregularity pattern, where N is a positive integer (N≧2).

The basic irregularity pattern and the (N−1) modified basic irregularity pattern or patterns in each of the blocks are arranged in a direction perpendicular to the arrangement direction. The basic irregularity pattern, which is continuous at either end thereof in a same direction as the arrangement direction, is divided in a same direction as the arrangement direction, thereby forming N sub-patterns. Each of the (N−1) modified basic irregularity pattern or patterns is formed by the N sub-patterns circularly shifted one by one.

Therefore, in each of the blocks, the sub-patterns of a same kind, which have the same irregularity, are arranged in such a way as to be continuous in an oblique direction with respect to the arrangement direction of the prism grooves. This is applicable to the whole reflector plate Since the irregularity pattern of the reflector plate is formed by the combination of the blocks arranged, the sub-patterns of a same kind are arranged in such a way as to be continuous in an oblique direction with respect to the arrangement direction in the whole reflector plate as well.

For example, in a color LCD device where each pixel is formed by three stripe-shaped elements, the pattern of each element is divided into three sub-patterns and then, these three sub-patterns are circularly shifted one by one. In this case, the angle between the direction in which the sub-patterns of the same kind are continuously arranged and the arrangement direction of the prism grooves will be approximately 45°.

As a result, a moiré generated by the irregularity pattern of the reflector plate is difficult to be recognized by the viewer, which improves the display quality.

In particular, when the first design method is adopted to cope with the first moiré generated by the pitch of the prism grooves of the guide plate and the wiring lines of the LCD panel, there is a problem that the generation of the third moiré is promoted. Specifically, in the first design method, the prism groove pitch is equalized to the pixel pitch, and the angle of the prism array (i.e., the prism grooves) with respect to the horizontal wiring lines of the LCD panel are set at zero. Therefore, the irregularity of one element (or one pixel) is repeated in the same direction as the arrangement direction of the prism grooves at the same period, promoting the third moiré. With the device according to the first aspect of the invention, however, the continuity of the sub-patterns of the same kind in the reflector plate is intentionally given to a different direction from the arrangement direction of the prism grooves. Thus, the third moiré is effectively eliminated, improving the display quality at high level.

Moreover, with the device according to the first aspect of the invention, the third moiré is reduced by a different method from the surface treatment of the polarizer plate adopted as the measure against the "second moiré". Therefore, recognizability does not degrade due to the excessive diffusibility of the polarizer plate.

Since the sub-patterns (i.e., the blocks) for at most N elements or pixels are arranged in an array to form the irregularity pattern of the reflector plate, the efficiency degradation of mask design for display control and/or pattern formation does not appear. By forming comparatively simple patterns for the reflector plate, moirés are reduced and the display quality is improved.

According to a second aspect of the present invention, a semi-transmissive type LCD device is provided, which comprises:

a reflector plate with a irregularity pattern and optical penetration areas;

a back light having an optical guide plate in which prism grooves are arranged in parallel to each other in an arrangement direction;

the irregularity pattern being formed by a combination of blocks arranged in an array;

each of the blocks including a basic irregularity pattern for one pixel or one element thereof, and (N–1) modified basic irregularity pattern or patterns each formed by modifying the basic irregularity pattern, where N is a positive integer (N≧2);

the basic irregularity pattern and the (N–1) modified basic irregularity pattern or patterns in each of the blocks being arranged in a direction perpendicular to the arrangement direction;

the basic irregularity pattern being continuous at either end thereof in a same direction as the arrangement direction and having an optical penetration area;

the basic irregularity pattern being divided in a same direction as the arrangement direction, thereby forming N sub-patterns; and each of the (N–1) modified basic irregularity pattern or patterns being formed by the N sub-patterns circularly shifted one by one.

With the semi-transmissive type LCD device according to the second aspect of the present invention, the same advantages as those in the device according to the first aspect are obtainable because of approximately the same reason as shown above.

Specifically, in a semi-transmissive type LCD device using the back light, a moiré is likely to be generated by the prism grooves of the prism sheet or the prism guide plate for raising the brightness, and the continuity of the optical penetration areas. However, with the semi-transmissive type LCD device according to the second aspect, the continuity of the optical penetration areas in the reflector plate is intentionally given to a different direction from the arrangement direction of the prism grooves. Thus, the above-described moiré similar to the third moiré is effectively eliminated, improving the display quality at high level.

For example, in a color LCD device where each pixel is formed by three stripe-shaped elements, the pattern of each element is divided into three sub-patterns and then, these three sub-patterns are circularly shifted one by one. In this case, the angle between the direction in which the sub-patterns of the same kind are continuously arranged and the arrangement direction of the prism grooves will be approximately 45°.

As a result, a moiré generated by the optical penetration areas of the reflector plate is difficult to be recognized by the viewer, which improves the display quality.

In a preferred embodiment of the device according to the first or second aspect of the invention, a combination of the basic irregularity pattern and the (N–1) modified basic irregularity pattern or patterns in each of the blocks is for M pixel or pixels, where M is a positive integer (M≦N).

For example, when a pixel is formed by three elements like a color LCD device, the basic irregularity pattern is for one of the three elements and the two modified basic irregularity patterns are for the remaining two elements in each of the blocks. Therefore, each of the blocks includes three basic irregularity patterns in total, which is for one pixel.

In other words, if the basic irregularity pattern is divided in the same direction as the arrangement direction, thereby forming three sub-patterns (i.e., N=3), each of the two modified basic irregularity patterns can be formed by the three sub-patterns circularly shifted one by one. In this case, the combination of the basic irregularity pattern and the two modified basic irregularity patterns constitutes a pixel of a color LCD device. Thus, the combination of the basic irregularity pattern and the (N–1) modified basic irregularity patterns in each of the blocks is for one pixel.

On the other hand, if the basic irregularity pattern is divided in the same direction as the arrangement direction, thereby forming six sub-patterns (i.e., N=6), each of the five modified basic irregularity patterns can be formed by the six sub-patterns circularly shifted one by one. In this case, the combination of the basic irregularity pattern and the five modified basic irregularity patterns constitutes two adjoining pixels of a color LCD device. Thus, the combination of the basic irregularity pattern and the (N–1) modified basic irregularity patterns in each of the blocks is for two pixels.

In the preferred embodiment of the device according to the first or second aspect, there is an additional advantage that display control is carried out more easily.

Needless to say, the basic irregularity pattern may be for one pixel. In this case, the basic irregularity pattern for one pixel is divided into the N sub-patterns. Each of the blocks includes the basic irregularity pattern and the (N–1) modified basic irregularity pattern or patterns. Thus, each of the blocks includes the N basic irregularity patterns (i.e., N pixels) in total (i.e., M=N).

According to a third aspect of the present invention, a method of fabricating a reflective type LCD device is provided, the device comprising a reflector plate with a irregularity pattern, and a front light having an optical guide plate in which prism grooves are arranged in parallel to each other in an arrangement direction.

The method comprises:

forming a basic irregularity pattern for one pixel or one element thereof in such a way as to be continuous at either end thereof in a same direction as an arrangement direction of prism grooves;

dividing the basic irregularity pattern in a same direction as the arrangement direction, thereby forming N sub-patterns, where N is a positive integer (N≧2);

circularly shifting the N sub-patterns one by one, thereby forming (N–1) modified basic irregularity pattern or patterns;

arranging the basic irregularity pattern and the (N−1) modified basic irregularity pattern or patterns in a direction perpendicular to the arrangement direction, thereby forming a block; and arranging a plurality of the blocks in an array, thereby forming an irregularity pattern of a reflector plate.

With the method of according to the third aspect of the present invention, the same advantages as those in the device according to the first aspect are obtainable because of approximately the same reason as shown about the device of the first aspect.

According to a fourth aspect of the present invention, a method of fabricating a semi-transmissive type LCD device is provided, the device comprising a reflector plate with a irregularity pattern and optical penetration areas, and a back light having an optical guide plate in which prism grooves are arranged in parallel to each other in an arrangement direction.

The method comprises:

forming a basic irregularity pattern for one pixel or one element thereof in such a way as to be continuous at either end thereof in a same direction as an arrangement direction of prism grooves;

dividing the basic irregularity pattern in a same direction as the arrangement direction, thereby forming N sub-patterns, where N is a positive integer (N≧2);

circularly shifting the N sub-patterns one by one, thereby forming (N−1) modified basic irregularity pattern or patterns;

arranging the basic irregularity pattern and the (N−1) modified basic irregularity pattern or patterns in a direction perpendicular to the arrangement direction, thereby forming a block; and arranging a plurality of the blocks in an array, thereby forming an irregularity pattern of a reflector plate.

With the method of according to the fourth aspect of the present invention, the same advantages as those in the device according to the first aspect are obtainable because of approximately the same reason as shown about the device of the second aspect.

In a preferred embodiment of the method according to the third or fourth aspect of the invention, a combination of the basic irregularity pattern and the (N−1) modified basic irregularity pattern or patterns in each of the blocks is for M pixel or pixels, where M is a positive integer (M≦N).

For example, if the basic irregularity pattern is divided in the same direction as the arrangement direction, thereby forming three sub-patterns (i.e., N=3), each of the two modified basic irregularity patterns can be formed by the three sub-patterns circularly shifted one by one. In this case, the total number of the basic irregularity pattern and the (N−1) modified basic irregularity pattern or patterns in each of the blocks is three, which forms a pixel of a color LCD device. Thus, the combination of the three basic irregularity patterns is for one pixel. On the other hand, if the basic irregularity pattern is divided in the same direction as the arrangement direction, thereby forming six sub-patterns (i.e., N=6), the combination of the basic irregularity pattern and the five modified basic irregularity patterns constitutes two adjoining pixels of a color LCD device. Thus, the said combination is for two pixels.

In the preferred embodiment of the method according to the third or fourth aspect, there is an additional advantage that display control is carried out more easily.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
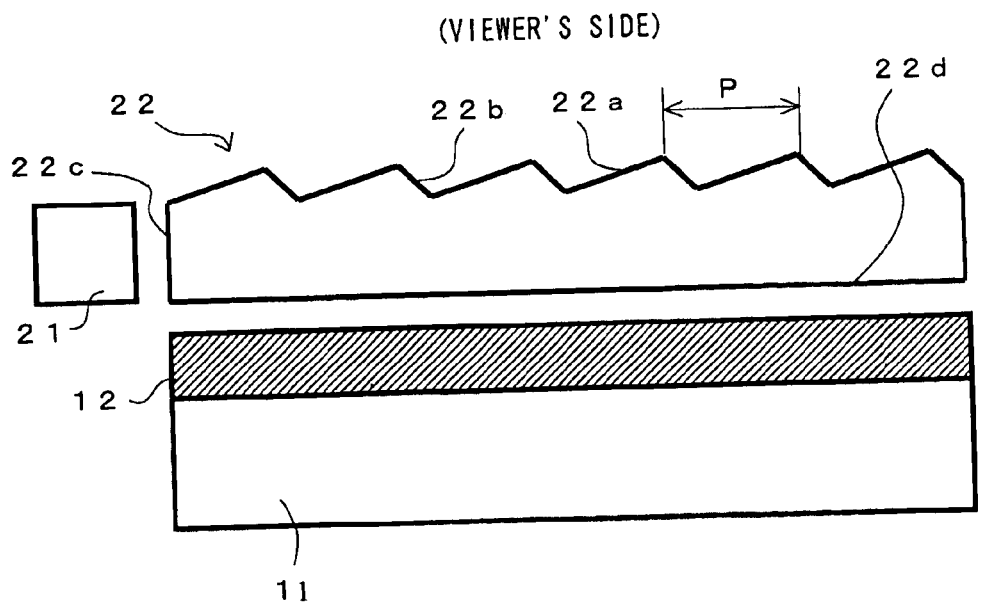
FIG. 1 is a conceptual cross-sectional view showing the whole structure of a prior-art reflective type LCD device.
Figure 2:
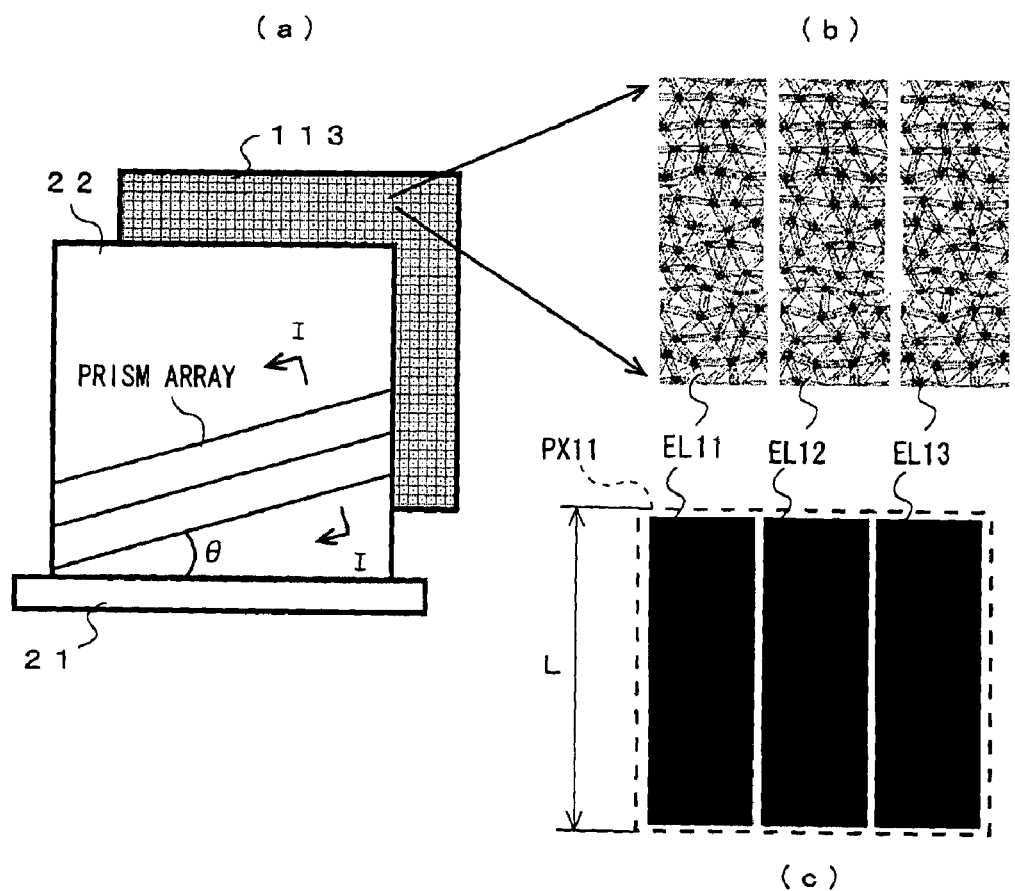
FIG. 2(a) is a conceptual plan view of the prior-art reflective type LCD device of FIG. 1 seen from the viewer's side.
FIGS. 2(b) and 2(c) are schematic views showing the irregularity pattern of the reflector plate in the device of FIG. 1, respectively.
Figure 3:
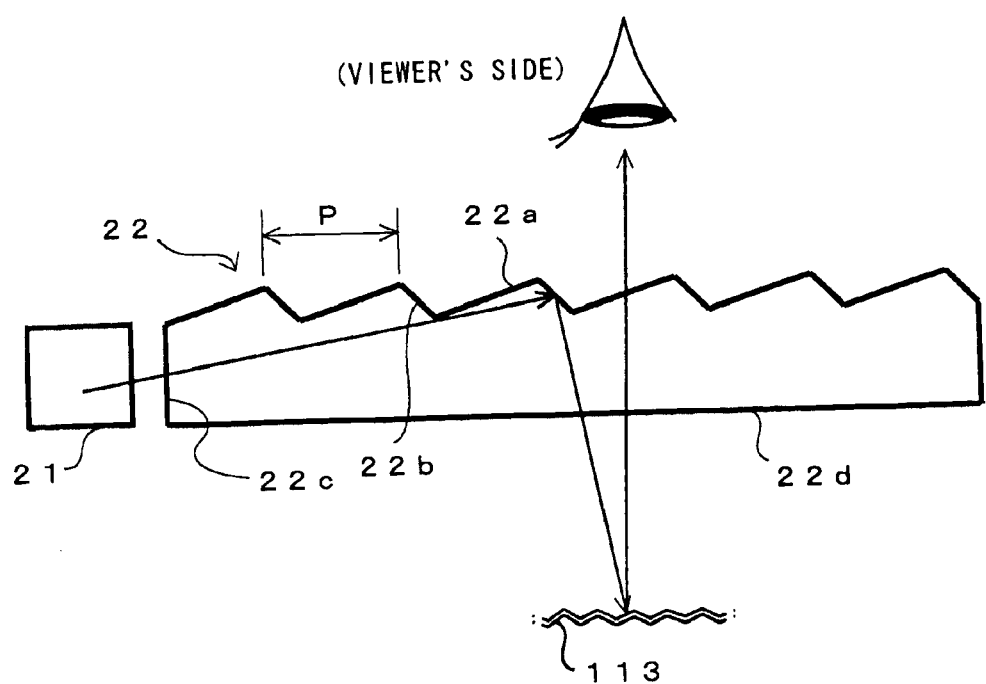
FIG. 3 is a conceptual cross-sectional view showing the whole structure of the prior-art LCD device of FIG. 1, which explains the propagation status of light in the guide plate of the front light.
Figure 4:
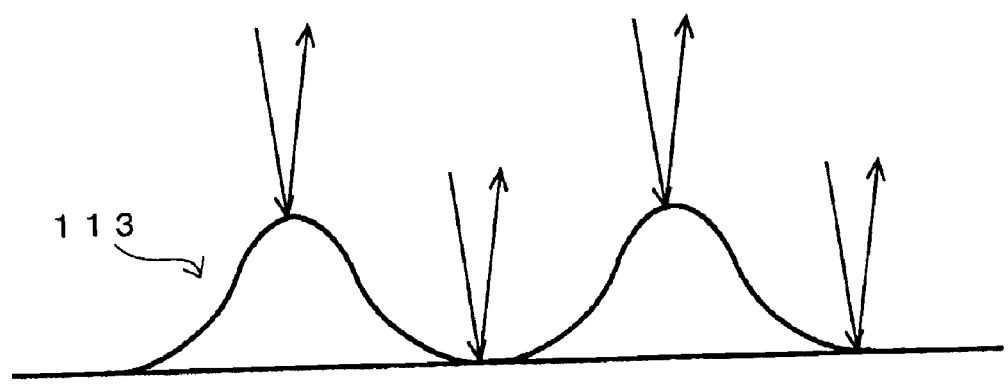
FIG. 4 is an enlarged, schematic partial cross-sectional view showing the cause of the "third moiré" in the prior-art LCD device of FIG. 1.
Figure 5:
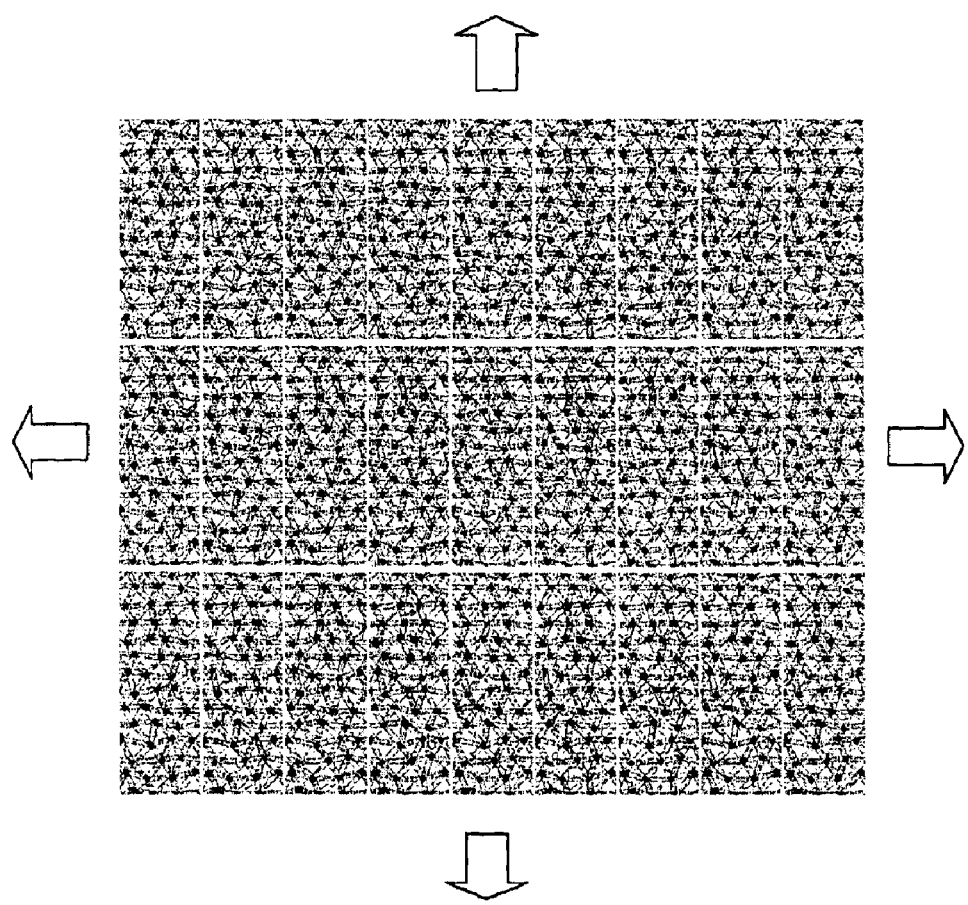
FIG. 5 is a schematic plan view showing the irregularity pattern of the reflector plate in the prior-art LCD device of FIG. 1.

Preferred embodiments of the present invention will be described in detail below while referring to the drawings attached.

First Embodiment

A LCD device according to a first embodiment of the invention is of the reflective type using a front light. The overall structure of this device is the same as that of the prior-art LCD device shown in FIG. 1. Specifically, the device comprises a reflective type LCD panel 11, a polarizer section 12, a light source 21 for the front light, and an optical guide plate 22 for the front light. Here, the panel 11 has a reflector plate with a surface irregularity incorporated therein.

Figure 7:
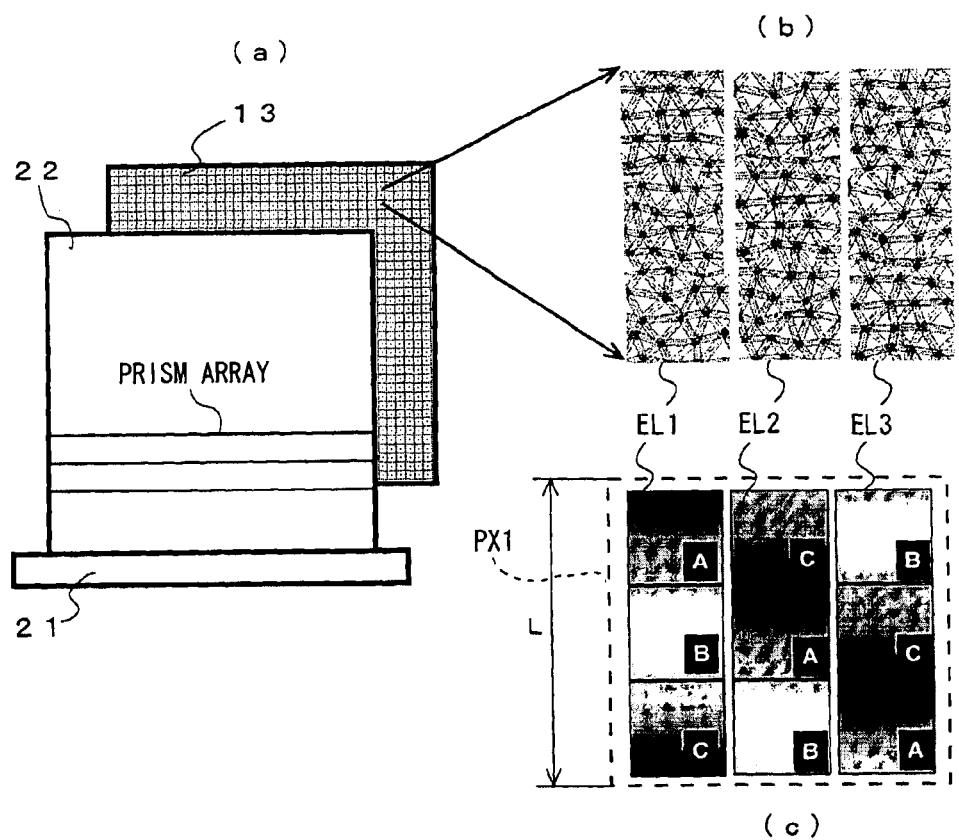
FIG. 7(a) is a conceptual plan view of the reflective type LCD device according to the first embodiment of FIGS. 6(a) to 6(c) seen from the viewer's side.
FIGS. 7(b) and 7(c) are schematic views showing the irregularity pattern of the block (i.e., a pixel) of the reflector plate in the device of FIG. 1, respectively.

As shown in FIG. 7(a), the front light, which includes the light source 21 and the optical guide plate 22, is located in the front side (i.e., the viewer's side) with respect to the panel 11. While the front light is turned on, the guide plate 22 receives the light emitted from the source 21. The guide plate 22 uniformizes the light in its inside to generate planar light and then, irradiates the light thus generated to the panel 11. Moreover, the panel 11 transmits the light reflected in the guide plate 22 to the viewer's side. A reflector plate 13 having an irregularity pattern on its surface is incorporated in the panel 11. On the viewer's side surface of the guide plate 22, a plurality of prisms is periodically arranged to form a prism array.

With the devic of the first embodiment, to prevent the "first moiré" generated by the prism grooves of the guide plate 22 of the front light and the wiring lines of the LCD panel 11, the above-described first design method is adopted. Specifically, the prism groove pitch P of the guide plate 22 is equalized to the pixel pitch L of the panel 11 (i.e., P=L) and at the same time, the angle θ of the prism array (i.e., the prism grooves) of the plate 22 with respect to the horizontal wiring lines of the panel 11 is set at zero (i.e., θ=0). Therefore, in the guide plate 22 of the device of the first embodiment, as shown in FIG. 7(a), the prism grooves (i.e., prism grooves) are formed or arranged parallel to each other in a direction perpendicular to the horizontal wiring lines of the panel 11 (i.e., the vertical direction in FIG. 7(a)).

The irregularity pattern of the reflector plate 13 on its surface is formed in the following way.

Figure 6:
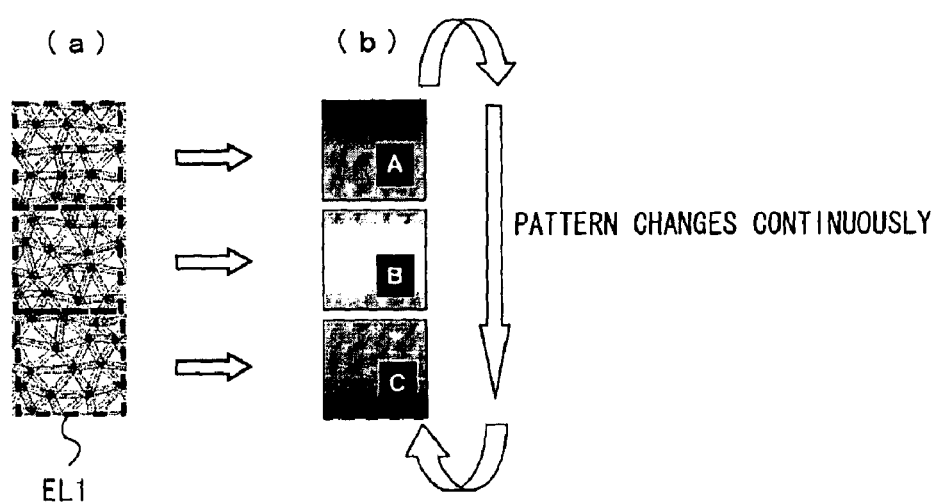
FIGS. 6(a) and 6(b) are schematic views showing the method of dividing the basic irregularity pattern of the reflector plate for one element of the pixel into three sub-patterns in a reflective type LCD device according to a first embodiment of the invention, respectively.

Specifically, as shown in FIG. 6(a), the irregularity pattern of an element EL1 is formed to be continuous at the top and bottom ends in the same direction as the arrangement or repetition direction of the prism grooves (i.e., the vertical direction in FIG. 7(a)). The irregularity pattern of an element EL1 thus formed is defined as the "basic irregularity pattern". Then, the "basic irregularity pattern" of the element EL1 is equally divided into three parts in the same direction as the arrangement direction, thereby forming three irregularity sub-patterns (N=3). This is easily realized by conducting the pattern design in such a way that the irregularity pattern of the element EL1 is continuous at its top and bottom ends, and that the element EL1 is optionally dividable into any parts.

The actual irregularity pattern consisting of the three sub-patterns of the element EL1 shown in FIG. 6(a) is difficult to present the difference among the sub-patterns. Therefore, these sub-patterns are shown by using gradation, as shown in FIG. 6(b). In FIG. 6(b), the sub-patterns arranged vertically are labeled A, B, and C, respectively. In this case, the irregularity pattern of the element EL1 of FIG. 6(a) can be expressed as the "basic irregularity pattern (A, B, C)".

FIGS. 7(b) and 7(c) show the irregularity pattern of the pixel (or block) PX1 formed by three elements EL1, EL2, and EL3. These elements EL1, EL2, and EL3 correspond to R, G, and B colors and therefore, color images can be displayed with the pixel EX1.

In the pixel PX1, the irregularity pattern of the element EL2 is obtained by shifting the sub-patterns A, B, and C of the element EL1 downward by one. Similarly, the irregularity pattern of the element EL3 is obtained by shifting the sub-patterns A, B, and C of the element EL2 downward by one. In other words, the irregularity patterns of the elements EL2 and EL3 are obtained by circularly shifting the sub-patterns A, B, and C of the "basic irregularity pattern (A, B, C)" one by one, as clearly shown in FIG. 7(c). The irregularity pattern of the element EL2 is expressed as the "modified basic irregularity pattern (C, A, B)" and the irregularity pattern of the element EL3 is expressed as the "modified basic irregularity pattern (B, C, A)".

In this way, the irregularity pattern of the pixel PX1 consisting of the three elements EL1, EL2, and E13 is formed by the "basic irregularity pattern (A, B, C)", the "modified basic irregularity pattern (C, A, B)", and the "modified basic irregularity pattern (B, C, A)". These basic irregularity patterns (A, B, C)", (C, A, B) ", and (B, C, A) " are arranged in the direction perpendicular to the arrangement direction of the prism grooves (i.e., in the horizontal direction in FIG. 7(c)).

In the present invention, as described in "SUMMARY OF THE INVENTION", the irregularity pattern of the reflector plate 13 is formed by the combination of blocks arranged in an array. Each of the blocks includes a basic irregularity pattern (A, B, C) for one pixel or one element thereof and, (N–1) modified irregularity patterns (C, A, B) and (B, C, A). The basic irregularity pattern and the (N–1) modified basic irregularity patterns in each of the blocks are arranged in a direction perpendicular to the arrangement direction of the prism grooves, as shown in FIG. 7(c). As a result, the pixel PX1 shown in FIG. 7(c) corresponds to the "block" in the device of the first embodiment, The actual irregularity pattern of the pixel (i.e., block) PX1 of FIG. 7(c) is shown in FIG. 7(b) As seen from FIG. 7(b), the basic irregularity patterns in the elements EL1 and EL2 (or EL2 and EL3) adjacent horizontally are continuous in an oblique direction.

By repeatedly arranging the irregularity pattern of the pixel PX1 (i.e., block) in such a way as to form an array on the whole surface of the reflector plate 13, the surface irregularity pattern of the plate 13 is realized.

Here, the pattern-changing direction in the block or pixel PX1 is described. As explained above, the pixel PX1 is formed by the basic irregularity pattern (A, B, C) of the element EL1, the modified basic irregularity pattern (C, A, B) of the element EL2, and the modified basic irregularity pattern (B, C, A) of the element EL3. Therefore, the direction in which the sub-patterns (i.e., A, B, or C) of the same kind are continuously arranged in the pixel PX1 is at an angle of approximately 45° with respect to the arrangement direction of the prism grooves of the guide plate 22, i.e., the vertical direction in FIG. 7(a).

Since the block or pixel PX1 is repeatedly arranged to form an array on the surface of the reflector plate 13, the sub-patterns A, B, or C of the same kind are continuously arranged in the plate 13 at an angle of approximately 45° with respect to the arrangement direction of the prism grooves. In other words, the line on which the same sub-patterns A, B, or C (e.g., like A →A →A →A) are continuously arranged is at an angle of approximately 45° with respect to the said arrangement direction. Therefore, the "third moiré" generated by the surface irregularity of the reflector plate 13 of the panel 11 is difficult to be recognized. As a result, the display quality is improved.

With the first embodiment, as described above, the "first design method" is adopted. This means that, as explained previously about the prior-art LCD device, the pixel PX1 is repeatedly arranged in the same direction as the arrangement direction of the prism grooves of the guide plate 22 at the same period as the grooves. Therefore, there is a possibility that the "third moiré" is promoted. However, in the first embodiment of the invention, the continuity of the sub-patterns of the same kind (A, B, or C) in the reflector plate 13 is intentionally given to a different direction from the arrangement direction of the prism grooves. As a result, the third moiré is effectively eliminated, improving the display quality at high level.

Moreover, with the LCD device according to the first embodiment, the third moiré is reduced without using the surface treatment of the polarizer plate to be adopted as the measure against the "second moiré" (which is generated by the mirror reflection directly below the guide plate 22). Therefore, recognizability does not degrade due to the excessive diffusibility of the polarizer section 12.

Additionally, because the sub-patterns for at most three elements EL1, EL2, and EL3 (N=3) (i.e., the block or pixel PX1) are repeatedly arranged in an array to form the surface irregularity pattern of the reflector plate 13, the efficiency degradation of mask design for display control and/or pattern formation does not appear. By forming comparatively simple patterns for the reflector plate 13, moirés are reduced and the display quality is improved.

Second Embodiment

Figure 8:
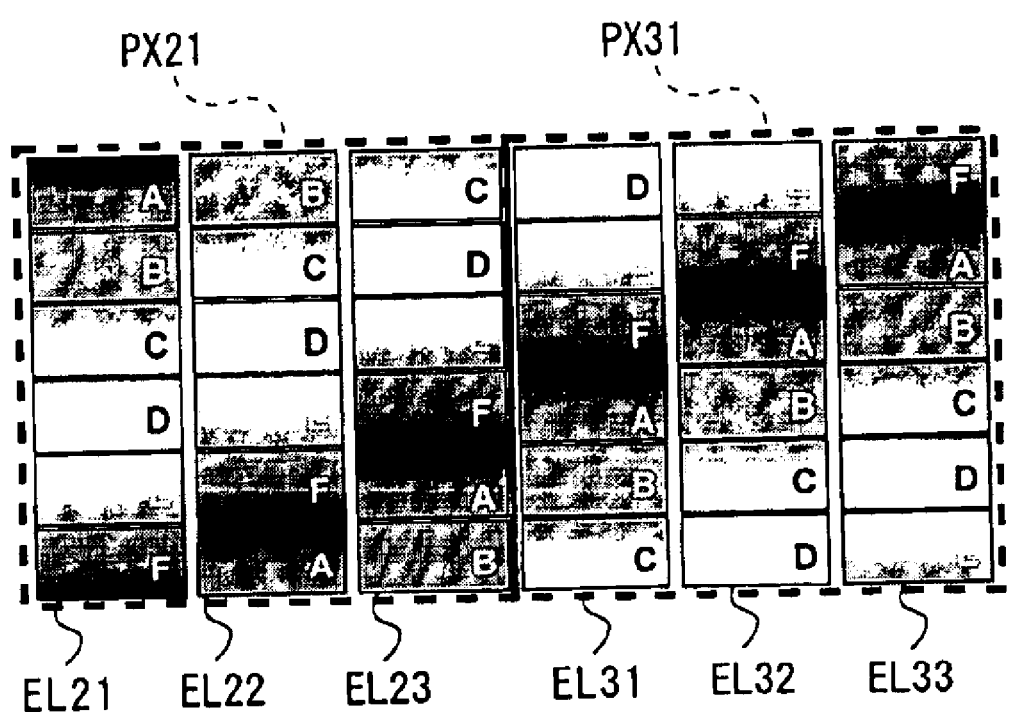
FIG. 8 is a schematic view showing the irregularity pattern of the block (i.e., two pixels) of the reflector plate in a reflective type LCD device according to a second embodiment of the invention.

FIG. 8 shows the irregularity pattern of the block of the reflector plate 13 in a reflective type LCD device using a front light according to a second embodiment of the invention.

In the first embodiment, the "basic irregularity pattern" of the element EL1 of the pixel PX1 is equally divided into three parts, thereby forming the thre irregularity sub-patterns A, B, and C. The "modified basic irregularity patterns" of the elements EL2 and EL3 of the pixel PX1 are respectively formed by circularly shifting the sub-patterns A, B, and C one by one. The irregularity pattern of the pixel PX1 (i.e., the block) is arranged in an array, thereby forming the surface irregularity pattern of the reflector plate 13.

Unlike this, in the reflective type LCD device using a front light according to the second embodiment, the "basic irregularity pattern" of the element EL21 of the pixel PX21 is equally divided into six parts, thereby forming the six irregularity sub-patterns A, B, C, D, E, and F (N=6), as shown in FIG. 8. The "modified basic irregularity patterns" of the elements EL22 and EL23 of the pixel PX21 are respectively formed by circularly shifting the sub-patterns A to F one by one. Similarly, the "modified basic irregularity pattern" of the elements EL31, EL32, and EL33 of the pixel PX31 are respectively formed by circularly shifting the sub-patterns A to F one by one like A →B →C →D →E →F →A.

The combination of the adjoining pixels PX21 and PX31 is defined as the "block". The block thus formed is arranged in an array, thereby forming the surface irregularity pattern of the reflector plate 13 in the device of the second embodiment. Therefore, the same advantages as those in the first embodiment are obtainable.

As shown in FIG. 8, the irregularity pattern of the element EL21 is formed to be continuous at the top and bottom ends. The irregularity pattern of the element EL1 is defined as the "basic irregularity pattern". The "basic irregularity pattern" of the element EL21 is equally divided into six parts (N=6) in the same direction as the arrangement direction of the prism grooves, thereby forming six irregularity sub-patterns. This is easily realized by conducting the pattern design in such a way that the irregularity pattern of the element EL21 is continuous at its top and bottom ends, and that the element EL21 is optionally dividable into any parts.

The irregularity pattern of the element EL22 is obtained by shifting the sub-patterns A to F of the element EL21 upward by one. Similarly, the irregularity pattern of the element EL23 is obtained by shifting the sub-patterns A to F of the element EL22 upward by one. The irregularity patterns of the elements EL31, EL32, and EL33 in the pixel PX31 are formed by the same way.

In this way, the irregularity pattern of the pixel PX21 consisting of the three elements EL21, EL22, and EL23 is formed by the "basic irregularity pattern (A, B, C, D, E, F)", the "modified basic irregularity pattern (B, C, D, E, F, A)", and the "modified basic irregularity pattern (C, D, E, F, A, B)". The irregularity pattern of the pixel PX31 consisting of the three elements EL31, EL32, and EL33 is formed by the "basic irregularity pattern (D, E, F, A, B, C)", the "modified basic irregularity pattern (E, F, A, B, C, D)", and the "modified basic irregularity pattern (F, A, B, C, D, E)".

Since the combination of the two pixels PX21 and PX31 (i.e., six elements EL21, EL22, EL23, EL31, EL32, and EL33 arranged in the horizontal direction in FIG. 8) constitutes the block, the total number of the modified basic irregularity patterns is five in the block.

These six basic irregularity patterns (A. B, C, D, E, F), (B, C, D, E, F, A), (C, D, E, F, A, B), CD, E, F, A, B, C), (E, F. A, B, C, D), and (F, A, B, C, D, E) are arranged in the direction perpendicular to the arrangement direction of the prism grooves (i.e., in the horizontal direction in FIG. 8). Thus, the surface irregularity pattern of the reflector plate 13 is formed.

With the device of the second embodiment, by forming the "block" with the two pixels PX21 and PX22, the continuity of the sub-patterns of the same kind (A, B, C, D, E, or F) in the reflector plate 13 is intentionally given to a different direction from the arrangement direction of the prism grooves. As a result, like the first embodiment, the third moiré is effectively eliminated, improving the display quality at high level.

Moreover, the surface treatment of the polarizer plate to be adopted as the measure against the "second moiré" is not used and therefore, recognizability does not degrade due to the excessive diffusibility of the polarizer section 12.

The sub-patterns for at most six elements EL21, EL22, EL23, EL31, EL32, and EL33 (N=6) (i.e., the block or pixel PX1) are repeatedly arranged in an array to form the surface irregularity pattern of the reflector plate 13. Thus, the efficiency degradation of mask design for display control and/or pattern formation does not appear. By forming comparatively simple patterns for the reflector plate 13, moirés are reduced and the display quality is improved.

Third Embodiment

Figure 9:
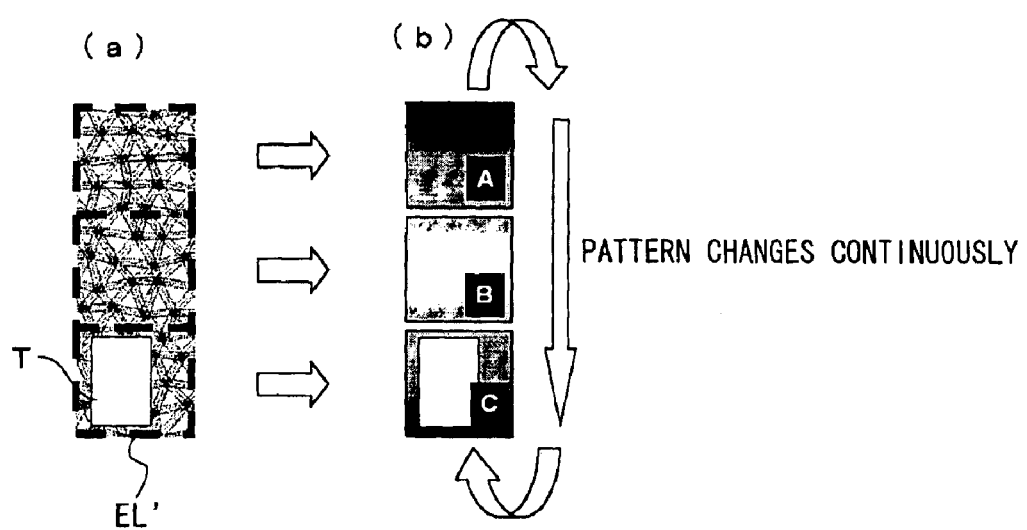
FIGS. 9(a) and 9(b) are schematic views showing the method of dividing the basic irregularity pattern of the reflector plate for one element of the pixel into three sub-patterns in a semi-transmissive type LCD device according to a third embodiment of the invention.
Figure 10:
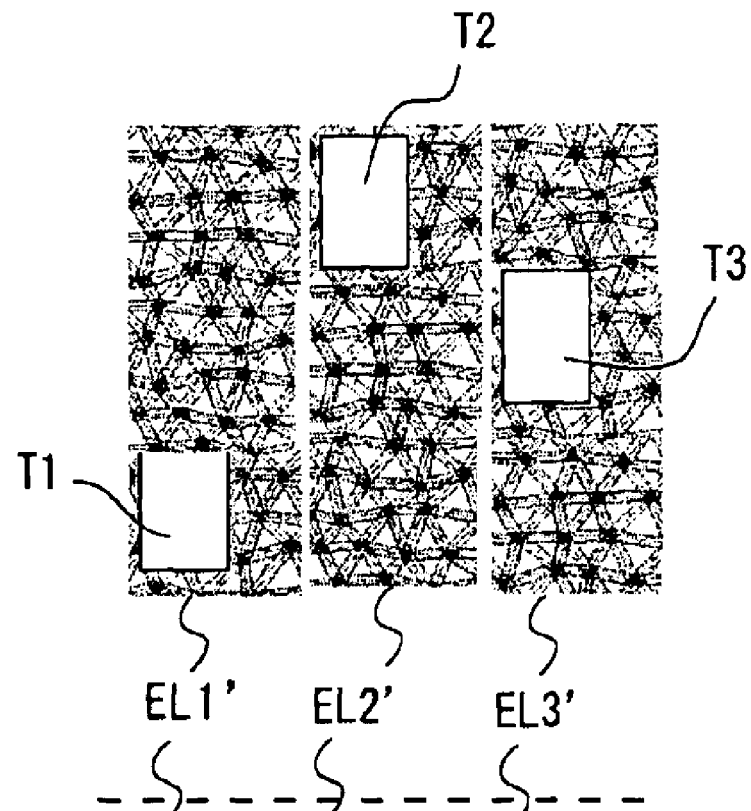
FIGS. 10(a) and 10(b) are schematic views showing the irregularity pattern of the block (i.e., a pixel) of the reflector plate in the device according to the third embodiment of FIGS. 9(a) and 9(b).
Figure 10:
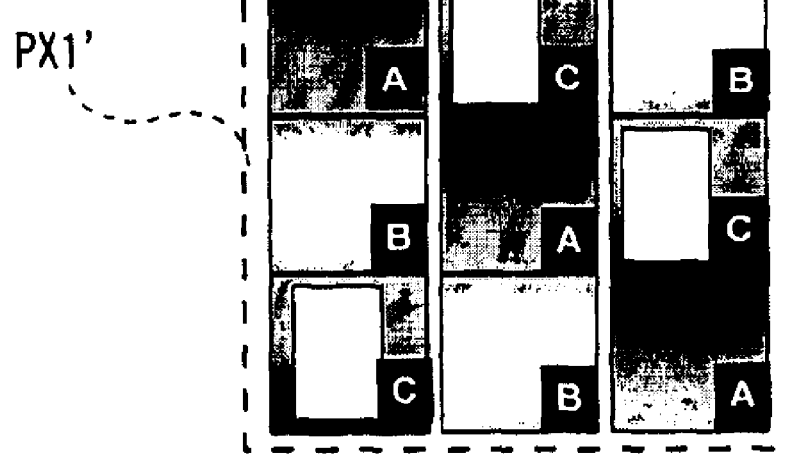

FIGS. 10(a) and 10(b) show the irregularity pattern of the pixel (or block) PX1' formed by three elements EL1', EL2', and EL3' in a semi-transmissive type LCD device according to a third embodiment of the invention. FIGS. 9(a) and 9(b) show the method of dividing the basic irregularity pattern of the reflector plate for the one element of the pixel PX' into three sub-patterns in the device according to the third embodiment.

In the semi-transmissive type device of the third embodiment, unlike the first and second embodiments, a back light is used instead of the front light as used in the first and second embodiments and at the same time, an optical penetration area or window is formed at an appropriate position in each element of the pixel. The other structure is approximately the same as the devices of the first and second embodiments. Since the overall structure of a semi-transmissive type LCD device is well known, the explanation about the structure is omitted here.

With the semi-transmissive type device of the third embodiment using a back light, it is popular that a prism sheet and/or a prism guide plate is/are provided to raise the brightness. Therefore, due to the relationship between the periodicity of the prism grooves and the periodicity of the penetration areas, there is a possibility that optical interference (moiré) occurs.

In FIG. 9(a), the irregularity pattern of the element EL' is formed to be continuous at its top and bottom ends in the same direction as the arrangement direction of the prism grooves (i.e., the vertical direction in FIG. 9(a)). At least one optical penetration area (here, one area) T is formed in the element EL'. The irregularity pattern of an element EL' is defined as th "basic irregularity pattern". The "basic irregularity pattern" of the element EL' is equally divided into three parts in the same direction as the arrangement direction, thereby forming three irregularity sub-patterns A, B<and C (N=3). This is easily realized by conducting the pattern design in such a way that the irregularity pattern of the element EL' is continuous at its top and bottom ends, that the element EL' is optionally dividable into any parts, and that the area T is included in one of the parts.

In the pixel PX1' shown in FIGS. 10(a) and 10(b), the irregularity patterns of the elements EL2' and EL3' are obtained by circularly shifting the sub-patterns A, B, and C of the "basic irregularity pattern (A, B, C)" one by one like A →C →B →A, as clearly shown in FIG. 10(b). The irregularity pattern of the element EL2' is expressed as the "modified basic irregularity pattern (C, A, B)" and the irregularity pattern of the element EL3' is expressed as the "modified basic irregularity pattern (B, C, A)".

These basic irregularity patterns (A, 8, C)", (C, A, B)", and (B, C, A)" are arranged in the direction perpendicular to the arrangement direction of the prism grooves (i.e., in the horizontal direction in FIG. 10(b)), forming the block.

The actual irregularity pattern of the pixel (i.e., block) PX1' of FIG. 10(b) is shown in FIG. 10(a). As seen from FIG. 10(a), the basic irregularity patterns in the elements EL1' and EL2' (or EL2' and EL3') adjacent horizontally are continuous in an oblique direction. The elements EL1', EL2', and EL3' have their own penetration area T1, T2, or T3, respectively.

By repeatedly arranging the irregularity pattern of the pixel PX1' (i.e., block) of FIG. 10(b) in such a way as to form an array on the whole surface of the reflector plate 13, the surface irregularity pattern of the plate 13 is realized.

With the device of the third embodiment, as describe above, like the first embodiment, continuity of the sub-patterns of the same kind (A, B, or C) in the reflector plate 13 is intentionally given to a different direction from the arrangement direction of the prism grooves. Moreover, the continuity of the penetration areas T1, T2, T3 in the reflector plate 13 is intentionally given to a direction at an angle 45° with respect to the arrangement direction of the prism grooves. As a result, a moiré generated by the relationship between the periodicity of the prism grooves and the periodicity of the penetration areas is effectively eliminated, improving the display quality at high level.

Other Embodiments

It is needless to say that the invention is not limited to the above-described first to third embodiments. Any modification is applicable to these embodiments. For example, although the basic irregularity pattern is divided into three or six sub-patterns in the above embodiments, it may be divided into any number of sub-patterns other than three and six.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A reflective type LCD device comprising:

a reflector plate with a irregularity pattern;

a front light having an optical guide plate in which prism grooves are arranged in parallel to each other in an arrangement direction;

the irregularity pattern being formed by a combination of blocks arranged in an array;

each of the blocks including a basic irregularity pattern for one pixel or one element thereof, and (N−1) modified basic irregularity pattern or patterns each formed by modifying the basic irregularity pattern, where N is a positive integer (N≧2);

the basic irregularity pattern and the (N−1) modified basic irregularity pattern or patterns in each of the blocks being arranged in a direction perpendicular to the arrangement direction;

the basic irregularity pattern being continuous at either end thereof in a same direction as the arrangement direction;

the basic irregularity pattern being divided in a same direction as the arrangement direction, thereby forming N sub-patterns; and each of the (N−1) modified basic irregularity pattern or patterns being formed by the N sub-patterns circularly shifted one by one.

2. The device according to claim 1, wherein a combination of the basic irregularity pattern and the (N−1) modified basic irregularity pattern or patterns in each of the blocks is for M pixel or pixels, where M is a positive integer (M≦N).

3. A method of fabricating a reflective type LCD device, the device comprising a reflector plate with a irregularity pattern, and a front light having an optical guide plate in which prism grooves are arranged in parallel to each other in an arrangement direction;

the method comprising:

forming a basic irregularity pattern for one pixel or one element thereof in such a way as to be continuous at either end thereof in a same direction as an arrangement direction of prism grooves;

dividing the basic irregularity pattern in a same direction as the arrangement direction, thereby forming N sub-patterns, where N is a positive integer (N≧2);

circularly shifting the N sub-patterns one by one, thereby forming (N−1) modified basic irregularity pattern or patterns;

arranging the basic irregularity pattern and the (N−1) modified basic irregularity pattern or patterns in a direction perpendicular to the arrangement direction, thereby forming a block; and arranging a plurality of the blocks in an array, thereby forming an irregularity pattern of a reflector plate.

4. The method according to claim 3, wherein a combination of the basic irregularity pattern and the (N−1) modified basic irregularity pattern or patterns in each of the blocks is for M pixel or pixels, where M is a positive integer (M≦N).

* * * * *